(12) United States Patent
Sercel et al.

(10) Patent No.: US 11,414,219 B2
(45) Date of Patent: Aug. 16, 2022

(54) SPACE MISSION ENERGY MANAGEMENT ARCHITECTURE

(71) Applicant: MOMENTUS SPACE LLC, San Jose, CA (US)

(72) Inventors: Joel Sercel, San Jose, CA (US); Aaron Mitchell, San Jose, CA (US)

(73) Assignee: MOMENTUS SPACE LLC, San Jose, CA (US)

( * ) Notice: Subject to any disclaimer, the term of this patent is extended or adjusted under 35 U.S.C. 154(b) by 270 days.

(21) Appl. No.: 16/773,880

(22) Filed: Jan. 27, 2020

(65) Prior Publication Data

US 2021/0197989 A1 Jul. 1, 2021

Related U.S. Application Data

(60) Provisional application No. 62/956,091, filed on Dec. 31, 2019, provisional application No. 62/814,496, filed on Mar. 6, 2019.

(51) Int. Cl.
 *B64G 1/26* (2006.01)
 *B64G 1/44* (2006.01)
 *B64G 1/40* (2006.01)

(52) U.S. Cl.
 CPC ............. *B64G 1/26* (2013.01); *B64G 1/401* (2013.01); *B64G 1/406* (2013.01); *B64G 1/446* (2013.01)

(58) Field of Classification Search
 CPC .............................. B64G 1/427; B64G 1/446
 See application file for complete search history.

(56) References Cited

U.S. PATENT DOCUMENTS

2017/0210493 A1* 7/2017 Marchandise ......... B64G 1/443
2018/0265224 A1* 9/2018 Foulds .................. B64G 1/402

OTHER PUBLICATIONS

McFall "Solar Thermal—Solar Electric Propulsion Hybrid Orbit Transfer Analysis" (Year: 2000).*
Kline "the MET (microwave electro-thermal) thruster using water vapor propellant" (Year: 2002).*
Preijde "Design of a Solar Thermal Power-Propulsion System for a Small Satellite" (Year: 2015).*
Carroll "Solar Orbit Transfer Vehicle" (Year: 2000).*
2017 Berg "Assessment of Multimode Spacecraft Micropropulsion Systems" (Year: 2017).*
Gucci "Design of a Water-Propellant 17.8-GHz Microwave Electrothermal Thruster" (Year: 2017).*

* cited by examiner

Primary Examiner — Arun Goyal
Assistant Examiner — William L Breazeal
(74) Attorney, Agent, or Firm — Marshall, Gerstein & Borun LLP

(57) ABSTRACT

A spacecraft propulsion system comprises two thrusters, each operating in accordance to a corresponding propulsion technique. A controller is configured to direct collected solar energy to heat a propellant for consumption in one of the two thrusters, or to generate electric energy for the other one of the two thrusters.

20 Claims, 6 Drawing Sheets

SPACE MISSION ENERGY MANAGEMENT ARCHITECTURE

CROSS-REFERENCE TO RELATED APPLICATIONS

The present application is a non-provisional application claiming priority to U.S. Provisional Patent Application No. 62/814,496, filed on Mar. 6, 2019 and titled "Method for Improving Efficiency of Spacecraft Propulsion During Orbital Transfers" and U.S. Provisional Patent Application No. 62/956,091, filed on Dec. 31, 2019 and titled "Space Mission Energy Management Architecture," the disclosure of each of which is incorporated herein by reference in its entirety for all purposes.

FIELD OF THE DISCLOSURE

The disclosure generally relates to operating a spacecraft and more specifically to sharing energy and propellant resources among thrusters of different types.

BACKGROUND

With increased commercial and government activity in the near space, a variety of spacecraft are under development, for various missions. For example, some spacecraft may be dedicated to delivering payloads (e.g., satellites) from one orbit to another. In such orbital transfer missions, the spacecraft generally requires a thruster that consumes a propellant in order to achieve mission objectives.

SUMMARY

This disclosure generally relates to improving efficiency of using a propellant and collected solar energy in a spacecraft system. The propellant and/or the energy may be shared between two thrusters, operating according to different propulsion techniques. The system may use the propellant to store, direct, or transform collected solar energy.

In one embodiment, a propulsion system operating in a spacecraft includes a power system configured to collect solar energy, a first thruster operating according to a first propulsion technique, and a second thruster operating according to a second propulsion technique. A controller of the propulsion system is configured to control supply of the solar energy collected by the power system to the first thruster and the second thruster. In another embodiment, a propulsion system operating in a spacecraft comprises: a tank storing propellant, a first thruster fluidicly coupled to the tank and operating according to a first propulsion technique, and a second thruster fluidicly coupled to the tank and operating according to a second propulsion technique. A controller of the propulsion system is configured to control supply of the propellant from the tank to the first thruster and the second thruster.

In yet another embodiment, a system for storing solar energy in a spacecraft includes a tank storing propellant; a power system configured to (i) collect solar energy and store at least a portion of the collected solar energy in the propellant in a vaporized state, and (ii) use a first portion of the vaporized propellant to generate electric energy; and a thruster configured to consume a second portion of the vaporized propellant to generate thrust.

Still in another embodiment, a propulsion system operating in a spacecraft includes a tank storing propellant, a fuel cell fluidicly coupled to the tank and configured to operate using a first portion of the propellant as a working fluid, and a thruster fluidicly coupled to the tank and configured to consume a second portion of the propellant to generate thrust.

DETAILED DESCRIPTION

A spacecraft of this disclosure may be configured for transferring a payload from a lower energy orbit to a higher energy orbit according to a set of mission parameters. The mission parameters may include, for example, a time to complete the transfer and an amount of propellant and/or fuel available for the mission. Generally, the spacecraft may collect solar energy and use the energy to power one or more thrusters. Different thruster types and/or operating modes may trade off the total amount of thrust with the efficiency of thrust with respect to fuel or propellant consumption, defined as a specific impulse.

The spacecraft in some implementations includes thrusters of different types to improve the efficiency of using solar energy when increasing orbital energy. In some implementations, the spacecraft uses the same subsystems for operating the different-type thrusters, thereby reducing the mass and/or complexity of the spacecraft, and thus decreasing mission time while maintaining and/or improving reliability. Additionally or alternatively, the spacecraft can choose or alternate between thrusters of different types as primary thrusters. The spacecraft can optimize these choices for various mission goals (e.g., different payloads, different destination orbits) and/or mission constraints (e.g., propellant availability). Example optimization of these choices can include variations in collecting and storing solar energy as well as in controlling when the different thrusters use the energy and/or propellant, as discussed below.

Figure 1:
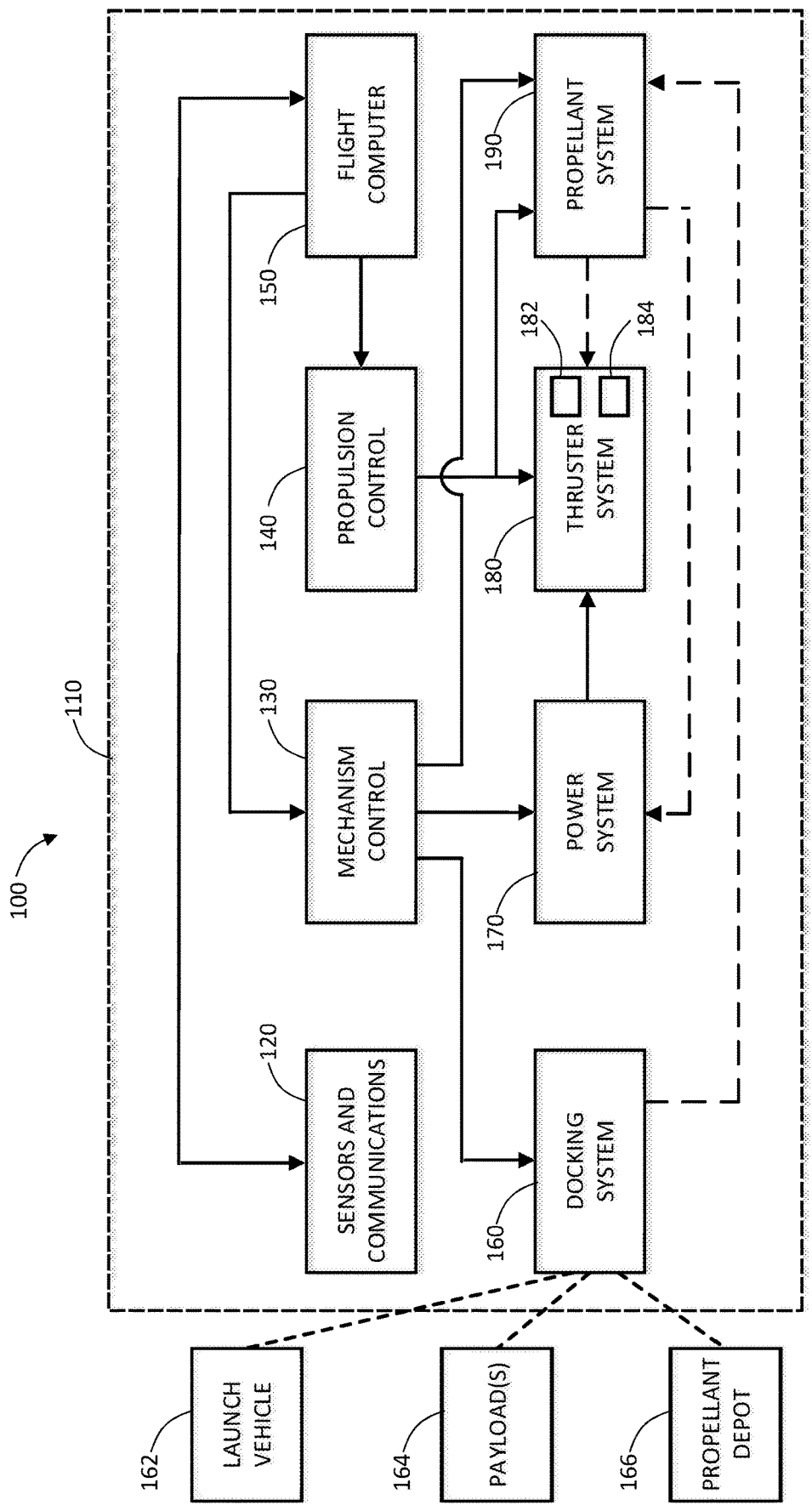
FIG. 1 is a block diagram of an example spacecraft configured for transferring a payload between orbits.

FIG. 1 is a block diagram of a spacecraft 100 configured for transferring a payload between orbits. The spacecraft 100 includes several subsystems, units, or components disposed in or at a housing 110. The subsystems of the spacecraft 100 may include sensors and communications components 120, mechanism control 130, propulsion control 140, a flight computer 150, a docking system 160 (for attaching to a launch vehicle 162, one or more payloads 164, a propellant depot 166, etc.), a power system 170, a thruster system 180 that includes a first thruster 182 and a second thruster 184, and a propellant system 190. Furthermore, any combination of subsystems, units, or components of the spacecraft 100 involved in determining, generating, and/or supporting spacecraft propulsion (e.g., the mechanism control 130, the propulsion control 140, the flight computer 150, the power system 170, the thruster system 180, and the propellant system 190) may be collectively referred to as a propulsion system of the spacecraft 100.

The sensors and communications components 120 may several sensors and/or sensor systems for navigation (e.g., imaging sensors, magnetometers, inertial motion units (IMUs), Global Positioning System (GPS) receivers, etc.), temperature, pressure, strain, radiation, and other environmental sensors, as well as radio and/or optical communication devices to communicate, for example, with a ground station, and/or other spacecraft. The sensors and communications components 120 may be communicatively connected with the flight computer 150, for example, to provide the flight computer 150 with signals indicative of information about spacecraft position and/or commands received from a ground station.

The flight computer 150 may include one or more processors, a memory unit, computer readable media, to process signals received from the sensors and communications components 120 and determine appropriate actions according to instructions loaded into the memory unit (e.g., from the computer readable media). Generally, the flight computer 150 may be implemented any suitable combination of processing hardware, that may include, for example, applications specific integrated circuits (ASICs) or field programmable gate arrays (FPGAs), and/or software components. The flight computer 150 may generate control messages based on the determined actions and communicate the control messages to the mechanism control 130 and/or the propulsion control 140. For example, upon receiving signals indicative of a position of the spacecraft 100, the flight computer 150 may generate a control message to activate one of the thrusters 182, 184 in the thruster system 180 and send the message to the propulsion control 140. The flight computer 150 may also generate messages to activate and direct sensors and communications components 120.

The docking system 160 may include a number of structures and mechanisms to attach the spacecraft 100 to a launch vehicle 162, one or more payloads 164, and/or a propellant refueling depot 166. The docking system 160 may be fluidicly connected to the propellant system 190 to enable refilling the propellant from the propellant depot 166. Additionally or alternatively, in some implementations at least a portion of the propellant may be disposed on the launch vehicle 162 and outside of the spacecraft 100 during launch. The fluidic connection between the docking system 160 and the propellant system 190 may enable transferring the propellant from the launch vehicle 162 to the spacecraft 100 upon delivering and prior to deploying the spacecraft 100 in orbit.

The power system 170 may include components (discussed in the context of FIGS. 4-7) for collecting solar energy, generating electricity and/or heat, storing electricity and/or heat, and delivering electricity and/or heat to the thruster system 180. To collect solar energy into the power system 170, solar panels with photovoltaic cells, solar collectors or concentrators with mirrors and/or lenses, or a suitable combination of devices may collect solar energy. In the case of using photovoltaic devices, the power system 170 may convert the solar energy into electricity and store it in energy storage devices (e.g, lithium ion batteries, fuel cells, etc.) for later delivery to the thruster system 180 and other spacecraft components. In some implementations, the power system 180 may deliver at least a portion of the generated electricity directly to the thruster system 180 and/or to other spacecraft components. When using a solar concentrator, the power system 170 may direct the concentrated (having increased irradiance) solar radiation to photovoltaic solar cells to convert to electricity. In other implementations, the power system 170 may direct the concentrated solar energy to a solar thermal receiver or simply, a thermal receiver, that may absorb the solar radiation to generate heat. The power system 170 may use the generated heat to power a thruster directly, as discussed in more detail below, to generate electricity using, for example, a turbine or another suitable technique (e.g., a Stirling engine). The power system 170 then may use the electricity directly for generating thrust or store electric energy as briefly described above, or in more detail below.

The thruster system 180 may include a number of thrusters and other components configured to generate propulsion or thrust for the spacecraft 100. Thrusters may generally include main thrusters that are configured to substantially change speed of the spacecraft 100, or as attitude control thrusters that are configured to change direction or orientation of the spacecraft 100 without substantial changes in speed. In some implementations, the first thruster 182 and the second thruster 184 may both be configured as main thrusters, with additional thrusters configured for attitude control. The first thruster 182 may operate according to a first propulsion technique, while the second thruster 184 may operate according to a second propulsion technique.

For example, the first thruster 182 may be a microwave-electro-thermal (MET) thruster. In a MET thruster cavity, an injected amount of propellant may absorb energy from a microwave source (that may include one or more oscillators) included in the thruster system 180 and, upon partial ionization, further heat up, expand, and exit the MET thruster cavity through a nozzle, generating thrust.

The second thruster 184 may be a solar thermal thruster. In one implementation, propellant in a thruster cavity acts as the solar thermal receiver and, upon absorbing concentrated solar energy, heats up, expands, and exits the nozzle generating thrust. In other implementations, the propellant may absorb heat before entering the cavity either as a part of the thermal target or in a heat exchange with the thermal target or another suitable thermal mass thermally connected to the thermal target. In some implementations, while the propellant may absorb heat before entering the thruster cavity, the thruster system 180 may add more heat to the propellant within the cavity using an electrical heater or directing a portion of solar radiation energy to the cavity.

The propellant system 190 may store the propellant for use in the thruster system 180. The propellant may include water, hydrogen peroxide, hydrazine, ammonia or another suitable substance. The propellant may be stored on the spacecraft in solid, liquid, and/or gas phase. To that end, the propellant system 190 may include one or more tanks. To move the propellant within the spacecraft 100, and to deliver the propellant to one of the thrusters, the propellant system may include one or more pumps, valves, and pipes. As described below, the propellant may also store heat and/or facilitate generating electricity from heat, and the propellant system 190 may be configured, accordingly, to supply propellant to the power system 170.

The mechanism control 130 may activate and control mechanisms in the docking system 160 (e.g., for attaching and detaching payload or connecting with an external propellant source), the power system 170 (e.g., for deploying and aligning solar panels or solar concentrators), and/or the propellant system (e.g., for changing configuration of one or more deployable propellant tanks). Furthermore, the mechanism control 130 may coordinate interaction between subsystems, for example, by deploying a tank in the propellant system 190 to receive propellant from an external source connected to the docking system 160.

The propulsion control 140 may coordinate the interaction between the thruster system 140 and the propellant system 190, for example, by activating and controlling electrical components (e.g., a microwave source) of the thruster system 140 and the flow of propellant supplied to thrusters by the propellant system 190. Additionally or alternatively, the propulsion control 140 may direct the propellant through elements of the power system 170. For example, the propellant system 190 may direct the propellant to absorb the heat (e.g., at a heat exchanger) accumulated within the power system 170. Vaporized propellant may then drive a power plant (e.g., a turbine, a Stirling engine, etc.) of the power system 170 to generate electricity. Additionally or alternatively, the propellant system 190 may direct some of the propellant to charge a fuel cell within the power system 190.

The subsystems of the spacecraft may be merged or subdivided in different implementations. For example, a single control unit may control mechanisms and propulsion. Alternatively, dedicated controllers may be used for different mechanisms (e.g., a pivot system for a solar concentrator), thrusters (e.g., a MET thruster), valves, etc. In the following discussion, a controller may refer to any portion or combination of the mechanism control 130 and/or propulsion control 140.

Figure 2:
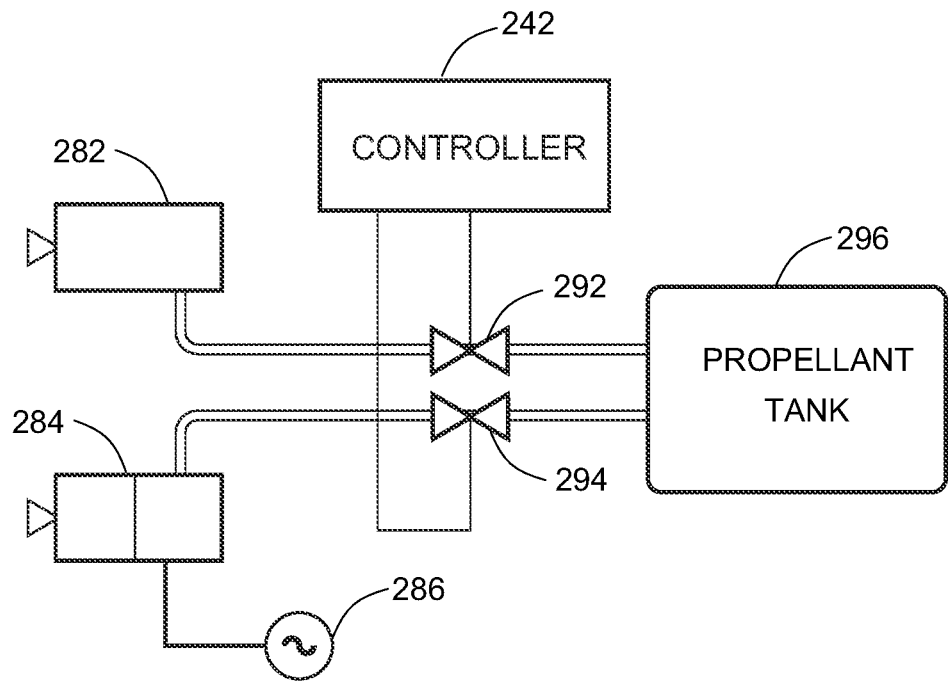
FIG. 2 illustrates an example configuration of a spacecraft system in which a controller controls supply of propellant to two thrusters.

FIG. 2 illustrates a configuration of a spacecraft system 100 in which a controller 242 controls supply of propellant to two thrusters 282, 284 from a shared propellant system that includes two valves 292, 294 to control flow rate of the propellant from a tank 296. The valve 292 may be disposed in a fluid line connecting the tank 296 to the thruster 282; and the valve 284 may be disposed in a fluid line connecting the tank 296 to the thruster 284. The controller 242, configured to operate the valves 292, 294 to control the supply of the propellant to the thrusters 282, 284, may be included in the propulsion control 140 of FIG. 1. The thrusters 282, 284 may be, correspondingly, the thrusters 182, 184. The thruster 282 may be a solar thermal thruster, a resistojet thruster, or any other suitable thruster. The thruster 284 may be, for example, a MET thruster that uses energy from a microwave source 286 to ionize the propellant. In some implementations, the propellant for at least one of the thrusters 282, 284 may flow from a dedicated accumulator tank that is fluidically connected (e.g., with pipes, valves, and/or pumps) to the common propellant tank 296. In any case, the controller 242 may select which thruster(s) consume the shared supply of propellant to generate thrust. In some implementations, the controller 242 may direct the flow of the propellant to generate electrical power for the microwave source 286, as discussed below. Additionally or alternatively, the controller 242 may direct the flow of the propellant to cool the operating microwave source 286

The controller 242 may direct the propellant to the thrusters 282, 284 to efficiently utilize the difference in available thrust and/or specific impulse of each thruster in optimizing propellant consumption and/or reducing mission time. For example, the thruster 282 may provide a higher thrust than the thruster 284 at the expense of a reduced specific impulse. The controller 242 may be configured to activate the thruster 282 based on a position within an orbital transfer maneuver, for example, to take advantage of the Oberth effect and maximize the efficiency of propellant consumption while reducing mission time. The controller 242 may be configured to activate the thruster 284 at a distinct section of the orbital transfer maneuver than the section corresponding to activating the thruster 282, as discussed in more detail in the discussions corresponding to FIGS. 8 and 9.

Figure 3:
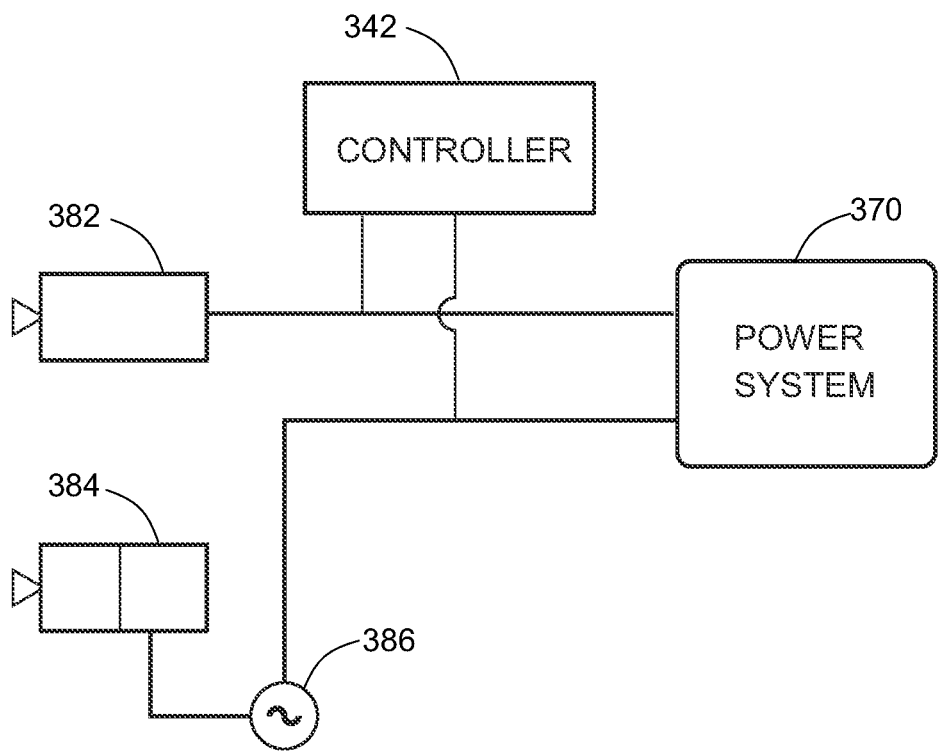
FIG. 3 illustrates an example configuration of a spacecraft system in which a controller controls conversion, distribution, and/or consumption by thrusters of a common supply of solar energy.

FIG. 3 illustrates a configuration of a spacecraft system 100 in which a controller 342 controls conversion, distribution, and/or consumption by thrusters 382, 384 of a common supply of power from a power system 370. The power system can 370 can provide solar power, for example. The controller 342 may be included in the mechanism control 130 and/or the propulsion control 140 of FIG. 1. The thrusters 282, 284 may be, correspondingly, the thrusters 182, 184. As described in more detail below, the controller 342 may direct at least a portion of the output of the power system 370 in radiant from to one of a number of thermal receiver, or may direct the flow of heat or electric energy (e.g., to a microwave source 386) generated by the power system 370. In any case, the controller 342 may select which thruster(s) consume the shared supply of solar energy to generate thrust.

Figure 4:
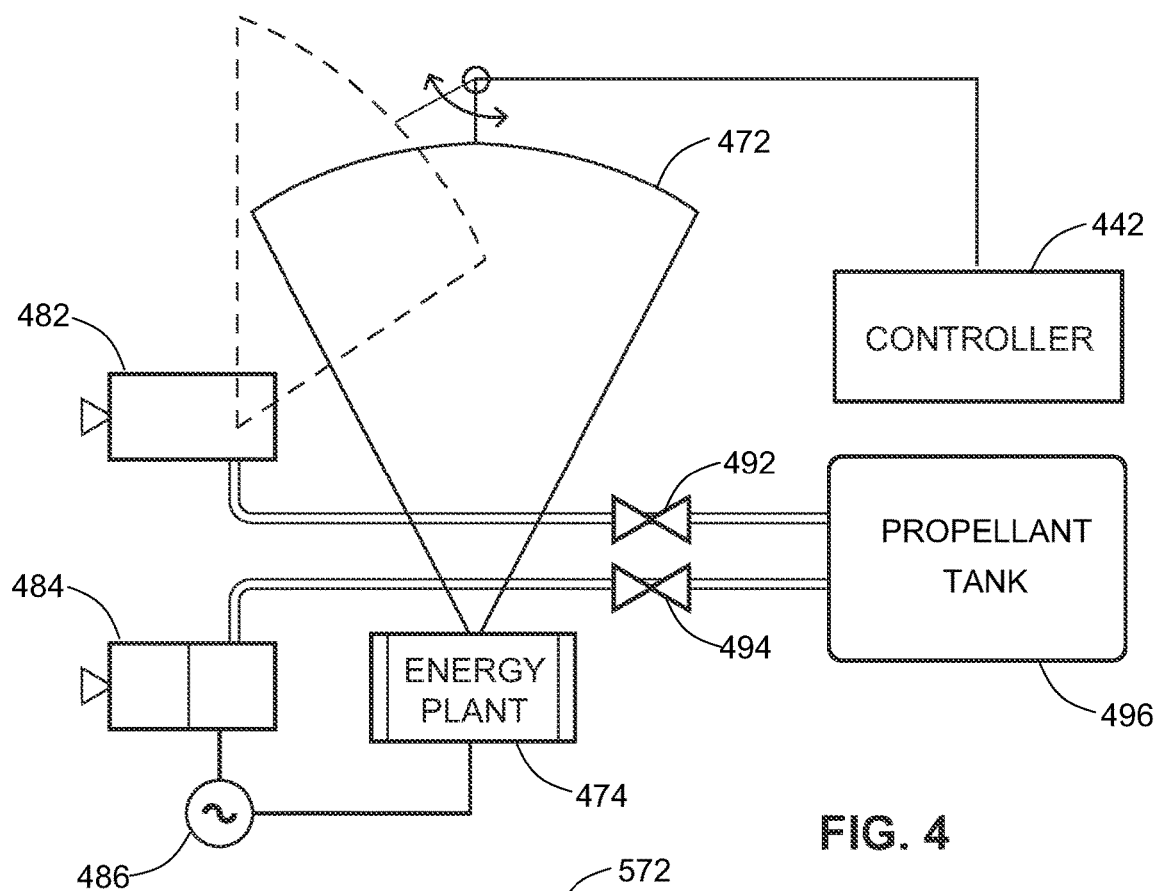
FIG. 4 illustrates an example configuration of a spacecraft system in which a controller is configured to use a solar concentrator to direct radiant solar energy to an energy plant or to a solar-thermal thruster.

FIG. 4 illustrates a configuration of a spacecraft system 100 in which a controller 442 (e.g., the controller 342) is configured to direct, using a solar concentrator 472 (configured as a component of the power system 170), radiant solar energy to an energy plant 474 or to a solar-thermal thruster 482. In some implementations, the solar concentrator 472 may include one or more secondary mirrors, lenses, and/or fiber-optic guides that the controller 442 cause to move to route the radiant energy. The solar concentrator 472 may be pivotable (i.e., attached to a mechanism with a pivot), and the controller 442 may be configured to cause the solar concentrator to pivot toward the energy plant 474 or the solar thermal thruster 482, for example. The solar thermal thruster 482 may include a thermal receiver. The thermal receiver may include a solid heat exchanger that absorbs solar energy and transfers it to the propellant fluid. Additionally or alternatively, the thermal receiver may include the propellant fluid directly absorbing the solar radiation. To that end, one or more additives (e.g., metal powders) may be included in the propellant.

The energy plant 474 may be configured to convert solar energy into electricity and deliver the electricity to a thruster. The thruster may be a MET thruster 484 and delivering electricity may include powering a microwave source 486. In some implementations, the energy plant may include photovoltaic devices. In other implementations, the energy plant may include a thermal receiver for converting radiant energy into heat and using heat to generate electric energy (e.g., using a turbine driven by heated propellant, a suitable heat engine, or thermoelectric devices) as described in the examples below. The energy plant 474 need not power the microwave source 486 directly nor continuously. The energy plant may include a battery, a fuel cell, or any suitable combination of electric energy storage devices that may supply power to the microwave source 486 in accordance with a controller (e.g., the controller 442, propulsion control 140, etc.).

Figure 5:
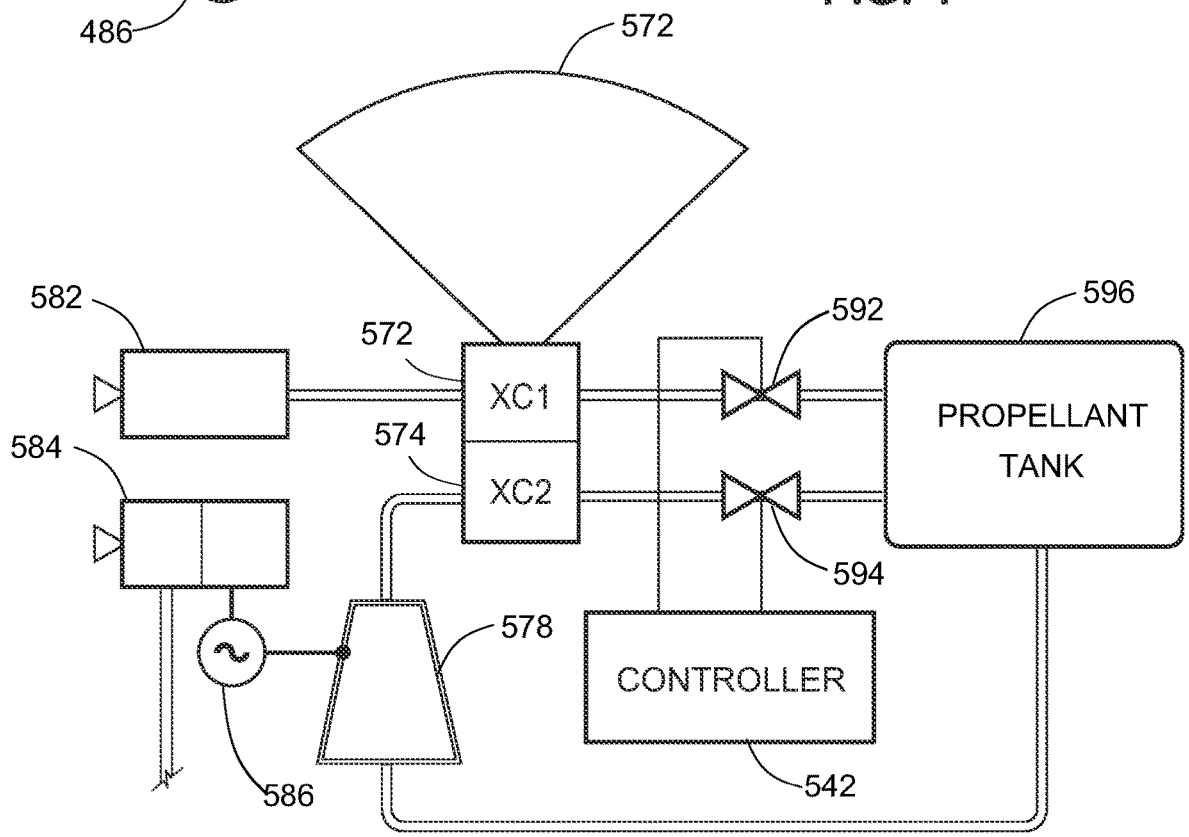
FIG. 5 illustrates an example configuration of a spacecraft system in which a controller 542 may direct propellant through one of the two heat exchangers within a thermal receiver.

FIG. 5 illustrates a configuration of a spacecraft system 100 in which a controller 542 (e.g., the controller 242) may direct propellant from the common tank 296 through a first heat exchanger 572 or a second heat exchanger 574, the two heat exchangers configured as a thermal receiver for the solar concentrator 576. The heat exchanger 574 may be fluidicly connected to an inlet of a turbine 578. A propellant stream 592 that absorbs thermal energy in the first heat exchanger 572 may use the thermal energy in thruster 582. On the other hand, a propellant stream 594 that absorbs thermal energy in the second heat exchanger 574 may generate electric energy for operating a MET thruster 584 by powering a microwave source 586. To that end, the propellant stream 594 may drive the turbine 578. In some implementations, the turbine 578 may be replaced with a suitable heat engine (e.g., a Stirling engine).

The heat exchangers 572, 574 may be configured as a thermal receiver that includes a surface that absorbs the radiative energy falling on the thermal receiver and a thermal mass that conducts the heat away from the surface. The heat exchangers 572, 574 may include corresponding fluidic channels guiding the propellant past the thermal mass. The thermal mass of the thermal receiver/heat exchangers may include a salt (e.g., sodium nitrate, calcium nitrate, etc.), a metal (e.g., aluminum, copper, iron, etc.) or another suitable material configured to melt and store thermal energy in the liquid phase and/or phase transition.

In operations, the controller 542 may direct the propellant to the fluidic channel of the heat exchanger 572, with the fluidic channel guiding the propellant to the thruster 582. Additionally or alternatively, the controller 542 may direct the propellant to the fluidic channel of the heat exchanger 574, with the fluidic channel guiding the propellant to the turbine 578 for generating electricity for the thruster 582. The outlet of the turbine 578 may be fluidicly connected to the tank 296 or, in some implementations, to the thruster 582 without returning to the tank 296. Thus, the fluidic channel of the heat exchanger 574 may guide the propellant toward the thruster 584.

Figure 6:
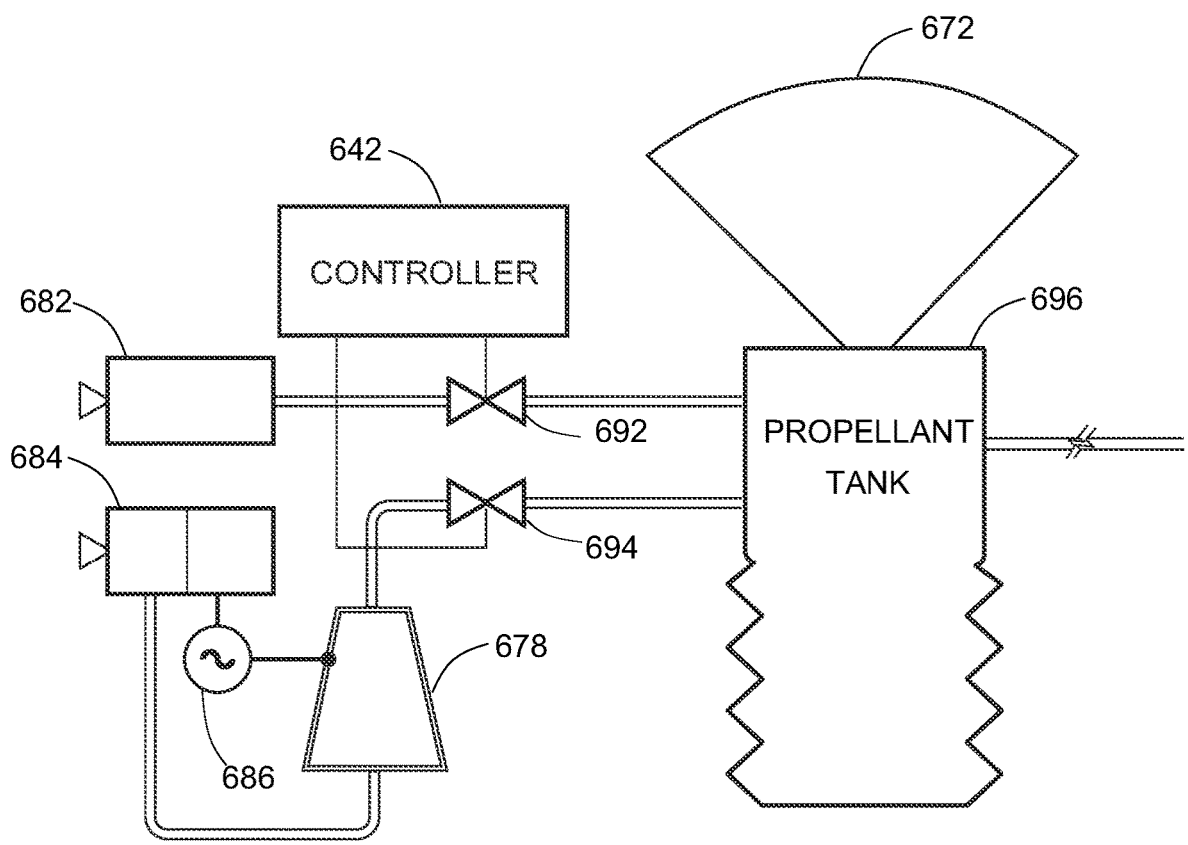
FIG. 6 illustrates an example configuration of a spacecraft system which converts solar energy into propellant enthalpy, and uses a controller to cause the heated propellant to be directed to a thruster or to a turbine to generate electric energy.

FIG. 6 illustrates a configuration of a spacecraft system 100 which converts solar energy into propellant enthalpy, and uses a controller 642 to direct the heated propellant to a thruster 682 via a valve 692, or, via a valve 694, to a turbine 678 (or any suitable energy plant) to generate electric energy. The thruster 682 may be a solar thermal thruster configured as one of the main thrusters, or, in some implementations, as an attitude adjustment thruster. The power system 170 may be configured to use the electric energy generated from the heated propellant to power a microwave source 686 for an MET thruster 694. The MET thruster 694 may consume the propellant used for generating electric energy. To that end, the outlet of the turbine 678 may be fluidicly connected with the MET thruster 694 (e.g., via one or more pipes, valves, pumps, accumulator tanks, etc.). Additionally or alternatively, the propellant system may return at least some of the propellant used to generate electric energy to the tank 696.

A propellant tank 696 may be configured to include a thermal receiver to convert to heat the solar radiation, directed to the tank 696 by the solar collector 672. The propellant may vaporize upon absorbing the heat from the thermal receiver, storing the collected solar energy. At least a portion of the tank 696 may be insulated and/or reflective to reduce the loss of propellant heat to space. Additionally or alternatively, the tank 696 may be expandable. The tank 696 may expand, for example, to maintain a suitable pressure range as the amount of heated propellant in the tank 696 changes.

The turbines 578, 678 in FIGS. 5 and 6, respectively, (or other energy conversion devices) need not power the corresponding microwave sources 586, 686 directly nor continuously. Instead the turbines 578, 678 (or other suitable power plants) may charge a battery, a fuel cell, or any suitable combination of electric energy storage devices that may supply power to the corresponding microwave sources 586, 686. An example electric energy storage implementation is illustrated in FIG. 7.

Figure 7:
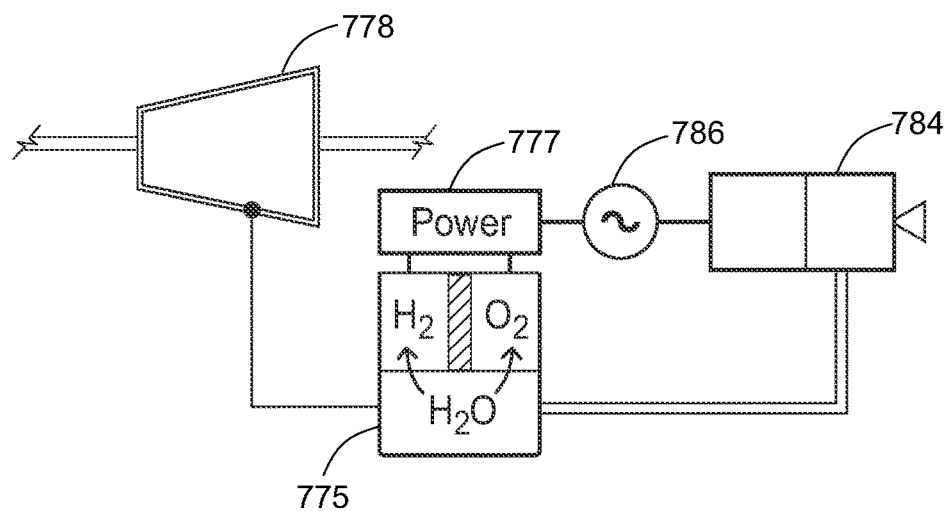
FIG. 7 illustrates an example configuration of a spacecraft system which uses propellant as a working fluid for a fuel cell.

FIG. 7 illustrates a configuration of a spacecraft system 100 which uses propellant as a working fluid for a fuel cell 775. A turbine 778 may be configured to supply electricity for cracking water (or another suitable fluid that may be used as a propellant for a MET thruster 784) to thereby charge the fuel cell 775. The fuel cell 775 may power a microwave source 786 directly or, for example, by way of a power unit 777. The power unit 777 may include circuits for power conditioning, and/or switching. In some implementations, the power unit 777 may include additional energy storage (e.g., a battery) configured to supply power to the generator 786 when the fuel cell 775 is discharged and the MET thruster 784 uses the remaining propellant in the system 100. In other implementations, the MET thruster 784 is configured to use the propellant (e.g., water) produced as a byproduct (e.g., of recombination of hydrogen and oxygen) of the fuel cell 775 as the fuel cell 775 powers the MET thruster.

Figure 8:
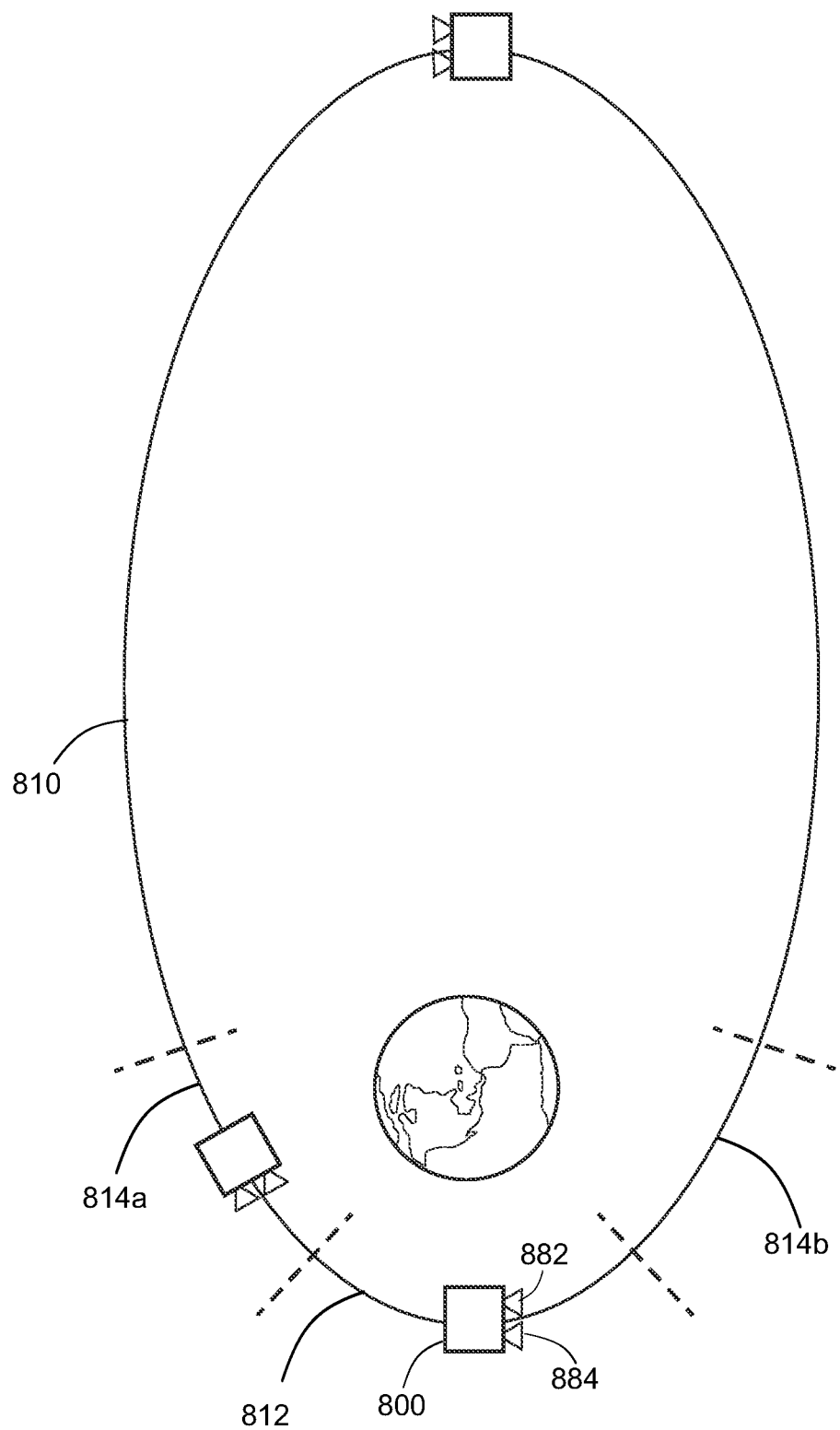
FIG. 8 illustrates an example spacecraft with two thrusters moving along a trajectory, where a controller is configured to activate one or more of the two thrusters based at least in part on a position along the trajectory.

FIG. 8 illustrates a spacecraft 800 (which may be the spacecraft 100) with thrusters 882, 884 moving along an orbit 810 (or any suitable portion of an orbital transfer maneuver trajectory). A controller may be configured to activate the thruster 882 of the spacecraft 800 at a segment 812 of the orbit 810 and/or the thruster 884 of the spacecraft 800 at segments 814*a,b* of the orbit 810. The segment 812 may be a segment substantially closest to the periapsis (closest to the planet and lowest potential energy point) of the orbit 810, while the segments 814*a,b* may be adjacent to the segment 812. The controller may receive a signal indicative of the position of the spacecraft 800, and switch from directing energy and/or propellant from one thruster to another. For example, upon detecting the position within the segment 814*b* of the spacecraft 800 moving towards the periapsis along the orbit 810, the controller may activate the thruster 884 (e.g., a MET thruster) to generate thrust while maintaining a substantially high specific impulse (Isp). On the other hand, upon detecting the position within the segment 814*b* of the spacecraft 800 moving towards the periapsis along the orbit 810, the controller may activate the thruster 884 (e.g., a direct solar thermal thruster) to generate higher thrust at the cost of a relatively smaller specific impulse (Isp). In some implementations, the thruster 884 may have higher thrust that the thruster 882 and may be configured to provide thrust throughout the segments 812 and 814*a,b*. The thruster 882 may be configured for providing thrust for attitude adjustments.

Figure 9:
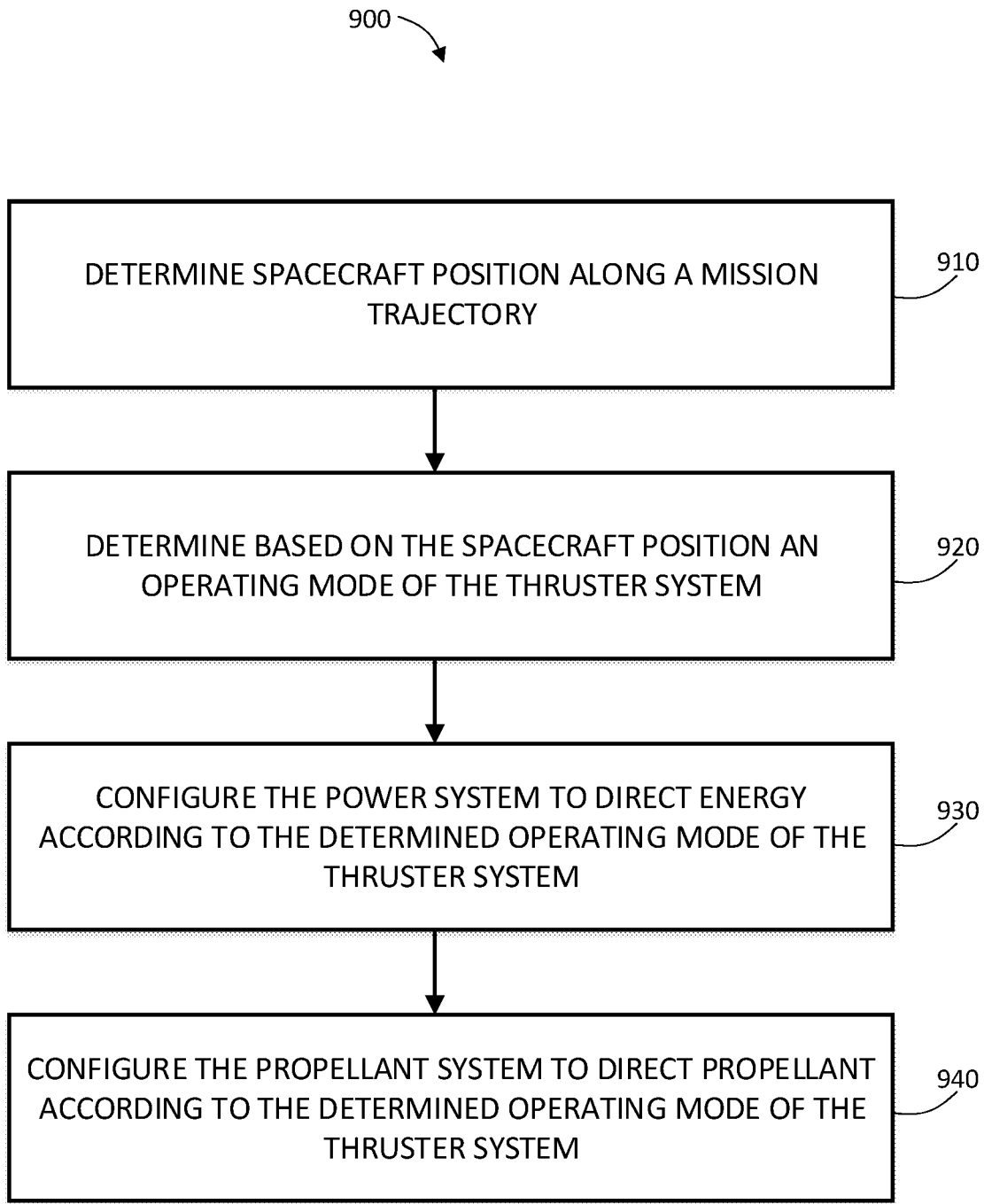
FIG. 9 is a flow diagram of an example method of operating a propulsion system of a spacecraft.

FIG. 9 is a flow diagram of an example method 900 of operating a propulsion system of a spacecraft (e.g., spacecraft 100). At block 910, the method 900 includes determining spacecraft position along a trajectory. Determining the position may include identifying an orbit of the spacecraft, identifying a section of the orbit within an elliptical orbit around a celestial body, and/or identifying spacecraft speed and orientation. One or more sensors (e.g., included in the sensors and communications component 120) may communicate the data indicative of the spacecraft position to a flight computer (e.g., the flight computer 150) or another suitable subsystem for configured for computing and control of subsystems configured for propulsion.

At block 920, the method 900 includes determining based on the space position an operating mode of a thruster system (e.g., the thruster system 180). The thruster system may include a first thruster operating according to a first propulsion technique and a second thruster operating according to a second propulsion technique. Determining the operating mode may include determining whether the first thruster and/or the second thruster are active and providing propulsion to the spacecraft. For example, the first thruster may be a MET thruster and the second thruster may be a solar thermal thruster. Determining the operating mode may further include determining a level or amount of thrust within an operating range of each thruster.

At block 930, the method 900 includes configuring a power system (e.g., the power system 170) to direct energy according to the determined operating mode of the thruster system. The method 900 may include converting solar energy to heat and/or electricity. For example, the power system may include an energy plant configured to convert solar energy into electricity and to deliver the electricity to the first thruster. To that end, the energy plant may include photovoltaic cells, a heat engine, and/or a turbine. A controller may cause the power system to guide solar energy toward the energy plant in response to determining that the operating mode of the thruster system includes activating the first thruster. The controller may alternatively guide solar energy toward a thermal receiver in a second thruster configured as a solar thermal thruster in response to determining that the operating mode of the thruster system includes activating the second thruster.

At block 940, the method 900 includes configuring a propellant system (e.g., the propellant system 190) to direct propellant according to the determined operating mode of the thruster system. The propulsion system may include a tank storing propellant fluidicly coupled to the first thruster and the second thruster (e.g., as illustrated in FIG. 2). A controller may supply the propellant to the first thruster and not supply the propellant to the second thruster when in a first section of an orbit, and/or supply the propellant to the second thruster and not supply the propellant to the first thruster when in a second section of an orbit, as discussed above in the context of FIG. 8. Furthermore, the controller may control an amount of propellant based on the determined amount of thrust when determining the operating mode includes determining the amount of thrust.

In some implementations, directing energy to one of the thrusters or to a power plant includes directing propellant. Thus, at least a portion of the method at block 940 may be implemented at block 930. For example, the propulsion system may include a thermal receiver with a first heat exchanger and a second heat exchanger (as illustrated in FIG. 5). Thus, directing propellant also directs the energy that the propellant picks up at one of the heat exchangers.

The following list of aspects reflects a variety of the embodiments explicitly contemplated by the present disclosure.

Aspect 1. A propulsion system operating in a spacecraft, the propulsion system comprising: a power system configured to collect solar energy; a first thruster operating according to a first propulsion technique; a second thruster operating according to a second propulsion technique; and a controller configured to control supply of the solar energy collected by the power system to the first thruster and the second thruster.

Aspect 2. The propulsion system of aspect 1, wherein: the first thruster is a microwave electro-thermal (MET) thruster, and the second thruster is a solar thermal thruster.

Aspect 3. The propulsion system of aspect 1 or 2, further comprising: an energy plant configured to convert solar energy into electricity and to deliver the electricity to the first thruster; wherein the controller causes the power system to guide solar energy toward the energy plant.

Aspect 4. The propulsion system of aspect 3, wherein the energy plant includes a photovoltaic cell.

Aspect 5. The propulsion system of aspect 3, wherein the energy plant includes at least one of: a heat engine or a turbine.

Aspect 6. The propulsion system of aspect 1 or 2, wherein: the second thruster includes a thermal receiver, and the controller causes the power system to guide solar energy toward the thermal receiver.

Aspect 7. The propulsion system of aspect 1 or 2, further comprising: a thermal receiver including: a first heat exchanger with a first fluidic channel guiding propellant to generate electric energy for the first thruster, and a second heat exchanger with a second fluidic channel guiding propellant to the second thruster.

Aspect 8. The propulsion system of aspect 1, wherein the power system includes a solar concentrator.

Aspect 9. The propulsion system of aspect 1, wherein: the solar concentrator is pivotable, and the controller causes the solar concentrator to pivot toward a first receiver associated with the first thruster or a second receiver associated with the second thruster.

Aspect 10. The propulsion system of aspect 1, wherein the first thruster corresponds to a first total amount of thrust and a first specific impulse, and the second thruster corresponds to a second total amount of thrust greater than the first total amount of thrust, and a second specific impulse smaller than the first specific impulse.

Aspect 11. The propulsion system of aspect 1, wherein the controller is configured to: supply the solar energy to the first thruster and not supply the solar energy to the second thruster when the spacecraft is in a first section of an elliptical orbit around a celestial body; and supply the solar energy to the second thruster and not supply the solar energy to the first thruster when the spacecraft is in a second section of an elliptical orbit around the celestial body.

Aspect 12. The propulsion system of aspect 1, wherein the controller is configured to: supply the propellant to the first thruster and not supply the propellant to the second thruster when the spacecraft is in a first orbit; and supply the propellant to the second thruster and not supply the propellant to the first thruster when the spacecraft is in a second orbit.

Aspect 13. The propulsion system of aspect 1, further comprising a tank storing propellant fluidicly coupled to the first thruster and the second thruster.

Aspect 14. A propulsion system operating in a spacecraft, the propulsion system comprising: a tank storing propellant; a first thruster fluidicly coupled to the tank, the first thruster operating according to a first propulsion technique; a second thruster fluidicly coupled to the tank, the second thruster operating according to a second propulsion technique; and a controller configured to control supply of the propellant from the tank to the first thruster and the second thruster.

Aspect 15. The propulsion system of aspect 14, wherein: the first thruster is a microwave electro-thermal (MET) thruster, and the second thruster is a solar thermal thruster.

Aspect 16. The propulsion system of aspect 14, wherein the first thruster corresponds to a first total amount a first range of thrust and a first efficiency of thrust, and the second thruster corresponds to a second total amount of thrust greater than the first total amount or a first range of thrust, and a second efficiency of thrust smaller than the first efficiency of thrust.

Aspect 17. The propulsion system of aspect 14, wherein the controller is configured to: supply the propellant to the first thruster and not supply the propellant to the second thruster when the spacecraft is in a first section of an elliptical orbit around a celestial body; and supply the propellant to the second thruster and not supply the propellant to the first thruster when the spacecraft is in a second section of an elliptical orbit around the celestial body.

Aspect 18. The propulsion system of aspect 14, wherein the controller is configured to: supply the propellant to the first thruster and not supply the propellant to the second thruster when the spacecraft is in a first orbit; and supply the propellant to the second thruster and not supply the propellant to the first thruster when the spacecraft is in a second orbit.

Aspect 19. The propulsion system of aspect 14, further comprising: a first valve disposed in a fluid line connecting the tank to the first thruster; and a second valve disposed in a fluid line connecting the tank to the second thruster; wherein the controller operates the first and second valves to control the supply of the propellant to the first and second thrusters.

Aspect 20. The propulsion system of aspect 14, wherein the propellant is at least one of (i) water, (ii) hydrazine, (iii) hydrogen peroxide, or (iii) ammonia.

Aspect 21. A system for storing solar energy in a spacecraft, the system comprising: a tank storing propellant; a power system configured to (i) collect solar energy and store at least a portion of the collected solar energy in the propellant in a vaporized state, and (ii) use a first portion of the vaporized propellant to generate electric energy; and a thruster configured to consume a second portion of the vaporized propellant to generate thrust.

Aspect 22. The system of aspect 21, wherein the thruster is a solar thermal thruster.

Aspect 23. The system of aspect 21 or 22, further comprising: a microwave electrothermal (MET) thruster, wherein an oscillator uses the generated electric energy to generate microwave energy.

Aspect 24. The system of aspect 23, wherein the MET thruster consumes the propellant to generate thrust.

Aspect 25. The system of aspect 21, wherein the tank is expandable.

Aspect 26. The system of aspect 21, wherein the power system includes a solar concentrator.

Aspect 27. A propulsion system operating in a spacecraft, the propulsion system comprising: a tank storing propellant; a fuel cell fluidicly coupled to the tank and configured to operate using a first portion of the propellant as a working fluid; and a thruster fluidicly coupled to the tank and configured to consume a second portion of the propellant to generate thrust.

Aspect 28. The propulsion system of aspect 27, wherein the propellant is at least one of (i) water, (ii) hydrozene, (iii) hydrogen peroxide, or (iii) ammonia.

Aspect 29. The propulsion system of aspect 27, wherein the thruster is a microwave electro-thermal (MET) thruster.

Aspect 30. The propulsion system of aspect 27, wherein the thruster is a solar thermal thruster.

Aspect 31. The propulsion system of aspect 27, wherein the second portion of the propellant includes at least some of the first portion of the propellant.

What is claimed:

1. A propulsion system operating in a spacecraft, the propulsion system comprising:
  a power system configured to collect solar energy, wherein the power system includes a solar concentrator attached to a pivot;
  a first thruster operating according to a first propulsion technique;
  a second thruster operating according to a second propulsion technique; and
  a controller configured to control supply of the solar energy collected by the power system to the first thruster and the second thruster, wherein the controller causes the solar concentrator to selectively pivot (i) to a first position toward a first receiver to guide solar energy toward the first thruster, and (ii) to a second position toward a second receiver to guide solar energy toward the second thruster.

2. The propulsion system of claim 1, wherein:
  the first thruster is a microwave electro-thermal (MET) thruster, and
  the second thruster is a solar thermal thruster.

3. The propulsion system of claim 1, further comprising:
  an energy plant configured to convert solar energy from the first receiver into electricity and to deliver the electricity to the first thruster;
  wherein the controller causes the power system to guide solar energy toward the energy plant by causing the solar concentrator to pivot toward the first receiver.

4. The propulsion system of claim 3, wherein the first receiver includes a photovoltaic cell of the energy plant.

5. The propulsion system of claim 3, wherein the energy plant includes at least one of: a heat engine or a turbine.

6. The propulsion system of claim 1, wherein:
  the second thruster includes a thermal receiver, and
  the controller causes the power system to guide solar energy toward the thermal receiver by causing the solar concentrator to pivot toward the second receiver.

7. The propulsion system of claim 1, further comprising a thermal receiver including:
  a first heat exchanger with a first fluidic channel guiding propellant to generate electric energy for the first thruster, and
  a second heat exchanger with a second fluidic channel guiding propellant to the second thruster.

8. The propulsion system of claim 1, wherein:
  the first thruster includes the first receiver; and
  the second thruster includes the second receiver.

9. The propulsion system of claim 1, wherein
  the first thruster corresponds to a first total amount of thrust and a first specific impulse, and
  the second thruster corresponds to a second total amount of thrust greater than the first total amount of thrust, and a second specific impulse smaller than the first specific impulse.

10. The propulsion system of claim 1, wherein the controller is configured to:
  supply the solar energy to the first thruster and not supply the solar energy to the second thruster when the spacecraft is in a first section of an elliptical orbit around a celestial body; and supply the solar energy to the second thruster and not supply the solar energy to the first thruster when the spacecraft is in a second section of the elliptical orbit around the celestial body.

11. The propulsion system of claim 1, wherein the controller is configured to:
supply the propellant to the first thruster and not supply the propellant to the second thruster when the spacecraft is in a first orbit; and
supply the propellant to the second thruster and not supply the propellant to the first thruster when the spacecraft is in a second orbit.

12. The propulsion system of claim 1, further comprising:
a tank storing propellant fluidically coupled to the first thruster and the second thruster.

13. A propulsion system operating in a spacecraft, the propulsion system comprising:
a tank storing propellant;
a solar concentrator attached to a pivot;
a first thruster including a microwave source, the first thruster fluidically coupled to the tank, the first thruster operating according to an electro-thermal (MET) propulsion technique;
a second thruster fluidically coupled to the tank, the second thruster operating according to a second propulsion technique; and
a controller configured to control supply of the propellant from the tank to the first thruster to cool the microwave source, and to the second thruster, wherein the controller causes the solar concentrator to selectively pivot
(i) to a first position toward a first receiver to guide solar energy toward the first thruster, and
(ii) to a second position toward a second receiver to guide solar energy toward the second thruster.

14. The propulsion system of claim 13, wherein:
the second thruster is a solar thermal thruster.

15. The propulsion system of claim 13, wherein
the first thruster corresponds to a first total amount of thrust and a first efficiency of thrust, and
the second thruster corresponds to a second total amount of thrust greater than the first total amount of thrust, and a second efficiency of thrust smaller than the first efficiency of thrust.

16. The propulsion system of claim 13, wherein the controller is configured to:
supply the propellant to the first thruster and not supply the propellant to the second thruster when the spacecraft is in a first section of an elliptical orbit around a celestial body; and
supply the propellant to the second thruster and not supply the propellant to the first thruster when the spacecraft is in a second section of the elliptical orbit around the celestial body.

17. The propulsion system of claim 13, wherein the controller is configured to:
supply the propellant to the first thruster and not supply the propellant to the second thruster when the spacecraft is in a first orbit; and
supply the propellant to the second thruster and not supply the propellant to the first thruster when the spacecraft is in a second orbit.

18. The propulsion system of claim 13, further comprising:
a first valve disposed in a first fluid line connecting the tank to the first thruster; and
a second valve disposed in a second fluid line connecting the tank to the second thruster;
wherein the controller operates the first valve and the second valve to control the supply of the propellant to the first thruster and the second thruster.

19. The propulsion system of claim 13, wherein the propellant is at least one of (i) water, (ii) hydrazine, (iii) hydrogen peroxide, or (iii) ammonia.

20. The propulsion system of claim 13, further comprising:
an energy plant configured to convert solar energy from the first receiver into electricity and to deliver the electricity to the first thruster;
wherein the controller causes the power system to guide solar energy toward the energy plant by causing the solar concentrator to pivot toward the first receiver.

* * * * *

UNITED STATES PATENT AND TRADEMARK OFFICE
CERTIFICATE OF CORRECTION

PATENT NO. : 11,414,219 B2
APPLICATION NO. : 16/773880
DATED : August 16, 2022
INVENTOR(S) : Joel Sercel et al.

It is certified that error appears in the above-identified patent and that said Letters Patent is hereby corrected as shown below:

In the Claims

Column 12, Line 55, Claim 9, "wherein" should be -- wherein: --.

Column 13, Line 21, Claim 13, "an electro-thermal (MET)" should be -- a microwave electro-thermal (MET) --.

Column 13, Line 29, Claim 13, "pivot" should be -- pivot: --.

Column 13, Line 35, Claim 15, "wherein" should be -- wherein: --.

Signed and Sealed this
Fourteenth Day of February, 2023

Katherine Kelly Vidal
*Director of the United States Patent and Trademark Office*